(12) United States Patent
Landgrebe et al.

(10) Patent No.: US 12,485,140 B2
(45) Date of Patent: Dec. 2, 2025

(54) TRANSMISSION PREVENTION OF VIRUSES WITH APPLICATION OF ANTISEPTIC COMPOSITION

(71) Applicant: Solventum Intellectual Properties Company, Maplewood, MN (US)

(72) Inventors: Kevin D. Landgrebe, Woodbury, MN (US); Ranjani V. Parthasarathy, Woodbury, MN (US); Katie F. Wlaschin, St. Paul, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 848 days.

(21) Appl. No.: 17/633,377

(22) PCT Filed: Aug. 28, 2020

(86) PCT No.: PCT/US2020/048560
§ 371 (c)(1),
(2) Date: Feb. 7, 2022

(87) PCT Pub. No.: WO2021/041923
PCT Pub. Date: Mar. 4, 2021

(65) Prior Publication Data
US 2022/0288108 A1    Sep. 15, 2022

Related U.S. Application Data

(60) Provisional application No. 62/894,384, filed on Aug. 30, 2019.

(51) Int. Cl.
| | | |
|---|---|---|
| *A61K 31/79* | (2006.01) | |
| *A61K 9/00* | (2006.01) | |
| *A61K 33/18* | (2006.01) | |
| *A61P 31/16* | (2006.01) | |

(52) U.S. Cl.
CPC ............ *A61K 31/79* (2013.01); *A61K 9/0043* (2013.01); *A61K 33/18* (2013.01); *A61P 31/16* (2018.01); *A61K 2121/00* (2013.01)

(58) Field of Classification Search
CPC ...... A61K 31/79; A61K 9/0043; A61K 33/18; A61K 2121/00; A61P 31/16
See application file for complete search history.

(56) References Cited

U.S. PATENT DOCUMENTS

| | | |
|---|---|---|
| 4,206,204 A | 6/1980 | Langford |
| 8,808,722 B2 | 8/2014 | Scholz |
| 2011/0178176 A1 | 7/2011 | New |
| 2017/0165296 A1 | 6/2017 | Goodall |
| 2018/0207122 A1 | 7/2018 | Scholz |
| 2020/0289552 A1 | 9/2020 | Kim |
| 2020/0316109 A1 | 10/2020 | Goodall |

FOREIGN PATENT DOCUMENTS

| | | |
|---|---|---|
| KR | 101935250 | 1/2019 |
| WO | WO 2006-099359 | 9/2006 |
| WO | WO 2012-177251 | 12/2012 |
| WO | WO 2021-038529 | 3/2021 |
| WO | WO 2021-041923 | 3/2021 |

OTHER PUBLICATIONS

Leung, "Potential Risks of Excess Iodine Ingestion and Exposure: Statement by the American Thyroid Association Public Health Committee", Thyroid, vol. 25, No. 2, 2015, pp. 145-146.
Stone, "The Action of Halogens on Influenza Virus with Special Reference to the Action of Iodine Vapour on Virus Mists". Australian Journal of Experimental Biology and Medical Science, 1945, vol. 23, No. 3, pp. 205-212.
Tsang, "Individual Correlates of Infectivity of Influenza A Virus Infections in Households", PLOS One, 2016, 11 pages.
International Search report for PCT International Application No. PCT/US2020/048560 mailed on Nov. 25, 2020, 5 pages.
Chinese Patent Application No. 202080058644.X, filed Feb. 18, 2022; Decision of Reexamination issued Dec. 17, 2024, English language translation included.

*Primary Examiner* — Snigdha Maewall (57) ABSTRACT

Aspects of the present disclosure relate to a method of preventing transmission of an enveloped RNA virus. The method includes applying to a mucosal tissue of a first mammalian subject not substantially colonized by the enveloped RNA virus an effective amount of an antiseptic composition or a pharmaceutically acceptable salt thereof according to a treatment plan. The first mammalian subject not substantially colonized by the enveloped RNA virus interacts with a second mammalian subject colonized by the enveloped RNA virus at a first viral load, the first mammalian subject has a second viral load based on the interaction, the second viral load is no greater than 0.5 log increase over an initial viral load over a duration of the treatment plan. The mucosal tissue is in the nasopharynx, nasal cavity, or anterior nares of the mammalian subject. The antiseptic composition comprises iodine, iodophor, or combinations thereof.

18 Claims, 5 Drawing Sheets

TRANSMISSION PREVENTION OF VIRUSES WITH APPLICATION OF ANTISEPTIC COMPOSITION

CROSS REFERENCE TO RELATED APPLICATIONS

This application is a national stage filing under 35 U.S.C. 371 of PCT/US2020/048560, filed Aug. 28, 2020, which claims the benefit of U.S. Provisional Application No. 62/894,384, filed Aug. 30, 2019, the disclosure of which is incorporated by reference in its/their entirety herein.

STATEMENT REGARDING FEDERAL FUNDING

This invention was made with government support under HR0011-19-3-0006 awarded by Defense Advanced Research Projects Agency (DARPA). The government has certain rights in the invention.

BACKGROUND

Viruses such as influenza, especially pandemic influenza, can present problems including significant morbidity and loss of productivity in the population. Influenza A has proven difficult to control using vaccination. On average, the yearly vaccine is only 59% effective and is often significantly less so. While influenza virus itself can cause mortality, most influenza-related deaths result from post-viral bacterial pneumonia due to invasion of the lung (via an influenza-damaged trachea) by *Streptococcus pneumoniae, Staphylococcus aureus*, or *Hemophilus influenzae* (and others) from a nasopharyngeal reservoir of one or more of these pathogens.

BRIEF SUMMARY

Aspects of the present disclosure relate to a method of preventing transmission of an enveloped RNA virus. The method includes applying to a mucosal tissue of a first mammalian subject not substantially colonized with the enveloped RNA virus an effective amount of an antiseptic composition or a pharmaceutically acceptable salt thereof according to a treatment plan. The first mammalian subject not substantially colonized with the enveloped RNA virus interacts with a second mammalian subject colonized with the enveloped RNA virus at a first viral load. The first mammalian subject has a second viral load based on the interaction. The second viral load is no greater than 0.5 log increase over an initial viral load over a duration of the treatment plan. The mucosal tissue is in the nasopharynx, oropharynx, nasal cavity, sinuses, or anterior nares of the mammalian subject. The antiseptic composition comprises iodine, iodophor, or combinations thereof. In at least one example, the no greater than 0.5 log increase can be as defined by area under the curve. In another example, the no greater than 0.5 log increase can mean that on any given day, the second viral load cannot be any greater than 0.5 log versus day zero.

In another aspect, a treatment plan can include applying the antiseptic composition to the (first and/or second) mammalian subject multiple times (i.e., multiple applications).

In another aspect, the application of the antiseptic composition to the first mammalian subject can include applying the antiseptic composition to the first mammalian subject at any time period (e.g., at least 1 hour, at least 4 hours, at least 8 hours, at least 24 hours, or greater than 24 hours) before the interaction with the second mammalian subject.

Additional aspects of the present disclosure relate to a method of preventing transmission of an enveloped RNA virus from a mammalian subject. The method can include applying an effective amount of an antiseptic composition or a pharmaceutically acceptable salt of the antiseptic composition to a mucosal tissue of the mammalian subject having a first viral load for a duration of a treatment plan. The mucosal tissue can be in the nasopharynx, oropharynx, nasal cavity, sinuses, or anterior nares of the mammalian subject. The method can include allowing enveloped RNA virus to agglomerate in or on the mucosal tissue from contact with the antiseptic composition. When a second mammalian subject that is not substantially colonized with the enveloped RNA virus interacts with the mammalian subject, the mammalian subject does not transmit the enveloped RNA virus to the second mammalian subject during the duration of the treatment plan. The antiseptic composition comprises iodine, iodophor, or combinations thereof, and a thickener. The antiseptic composition can include less than 10% by weight iodophor. The thickener can be configured to allow the antiseptic composition to be persistent on the mucosal tissue.

Additional aspects of the present disclosure relate to a method of preventing transmission of a virus (such as an enveloped RNA virus, e.g., influenza or coronavirus). The method includes applying to a mucosal tissue of a first mammalian subject colonized with the virus at a first viral load at ambient temperature an effective amount of an antiseptic composition or a pharmaceutically acceptable salt thereof according to a treatment plan, wherein the first mammalian subject is colonized by a virus at a first viral load. In some examples, the first viral load does not result in symptoms for the first mammalian subject. In some examples, the first mammalian subject is a recipient and the second mammalian subject is a donor, or vice versa. The method can also include allowing a second mammalian subject colonized with a virus at a second viral load to interact with the first mammalian subject, wherein the first mammalian subject is colonized by the virus at a third viral load based on the interaction. The third viral load is no greater than 0.5 log increase over the first viral load over the course of the treatment plan.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Aspects of the present disclosure can relate to a method of treatment or prophylaxis of a virus (such as influenza) using a film-forming iodine-containing composition. The film-forming iodine-containing composition can reduce transmission of the virus from one mammal to another mammal even when viral numbers in the nares of the one mammal increase or remain substantially the same after treatment of the one mammal using a film-forming povidone-iodine composition.

"Ambient temperature" refers to the temperature in the environment at which the method of the current invention is conducted. Typically, ambient temperature will be about 10° C. to about 30° C., and more particularly 15° C. to 25° C.

"Antiseptic" refers to a chemical agent that kills or inactivates pathogenic and non-pathogenic microorganisms including, for example, bacteria and viruses. Antiseptic agents can be bactericides, viricides, and/or fungicides, which kill bacteria, inactivate viruses, and kill fungi, respectively. Antiseptics generally interfere broadly with cellular metabolism and/or the cell envelope. Antiseptics are sometimes referred to as disinfectants, especially when used to treat hard surfaces.

"Antiviral agent" refers to an agent that inactivates a virus or that suppresses its ability to replicate. A number of antiviral agents are known. These include amantadine (which blocks uncoating of virus particles in influenza virus, type A) as well as a variety of nucleoside analogs that interfere with nucleic acid synthesis. Examples of nucleoside analogs include AZT, acyclovir, ganciclovir, and vidarabine. These drugs require virus replication for inactivation. Examples of suitable antiviral agents may include oseltamivir, zanamivir and ribavirin which are commercially available.

"Available iodine" refers to iodine of the iodophor which is ultimately available to be released from the polymer as free iodine ($I_2$). It therefore includes free iodine in solution, diatomic iodine available from tri-iodide ions, as well as diatomic iodine held within a reservoir formed by the polymer structure. The available iodine does not include iodide ions. Available iodine is measured by thiosulfate titration in accordance with United States and British Pharmacopeia monographs.

"Colonization" or "colonized" refers to having some presence of a virus whether asymptomatic, pre-symptomatic, or symptomatic.

"Effective amount" refers to the amount of the pharmaceutical composition and/or the enhancer component that, as a whole, provides a viricidal activity that reduces, prevents, or eliminates one or more species of virus resulting in an acceptable level of the viral load.

Typically, an effective amount of antiseptic results in at least a 0.5 log reduction, at least a 1 log reduction, at least a 1.5 log reduction, or more preferably at least a 2-log reduction after a 30-minute contact time with the virus or bacterium, preferably after only a 10-minute contact time with the virus or bacterium, and most preferably after only a 5-minute min contact time with the virus or bacterium.

It should be understood that in the compositions described herein, the concentrations or amounts of the components, when considered separately, may not inactivate virus to an acceptable level, or may not inactivate as broad a spectrum of viruses, or may not inactivate viruses as fast as the compositions; however, when used together such components provide an enhanced (preferably synergistic) viricidal activity (as compared to the same components used alone under the same conditions).

"Enveloped RNA virus" refers to an RNA virus that has a viral envelope. Examples of enveloped RNA viruses include flavivirus, alphavirus, togavirus, coronavirus, hepatitis D, orthomyxovirus (including influenza), paramyxovirus, rhabdovirus, bunyavirus, and filovirus.

"Film-forming" refers to a composition that when allowed to dry under ambient conditions (e.g., 23° C. and 50% relative humidity (RH)) on in-tact skin forms a continuous layer that does not flake off after simple flexing of the tissue.

"Infection" refers to the combination of the presence of the virus in a host and the host response to the virus. The infection can generally result in symptomatic responses from the host.

"Influenza" refers to influenza viruses A, B, C, D. Influenza virus A includes at least H1N1, H2N2, H3N2, H5N1, H7N7, H1N2, H9N2, H7N2, H7N3, H10N7, H7N9, H6N1.

"Inoculation" refers to the act or process of introducing a pathogen such as a virus into a living organism. Inoculation can generally refer to exposing the mammalian subject to the virus either directly (including via contact transmission from another animal) or indirectly or passively (including via airborne transmission from another animal). Inoculation occurs before the symptoms are observable in a mammalian subject.

"Interact" refers to contact transmission, or to airborne transmission between at least two animal subjects, or to transmission of pathogen from a pathogen-laden-surface to an animal.

"Limit of Detection" refers to the lowest concentration of virus that gives a response of at least three times the average of the baseline noise.

"Mammalian subject" refers to humans, sheep, horses, cattle, pigs, dogs, cats, guinea pigs, ferrets, rats, mice, bats, or other mammal.

"Mucosal tissue" refers to the mucus-producing membranous surfaces of the nasal cavity (including anterior nares, nasopharynx, etc.), vagina, and other similar tissues. Examples include mucosal membranes such as nasal, rectal, urethral, ureteral, vaginal, cervical, and uterine mucosal membranes.

"Retain" refers to the action of continuing to hold a virus within or on mucosal tissue during normal physiological activity (e.g., breathing, sneezing, coughing, spitting). Retention can be by virtue of entrapment, agglomeration, intracellular presence of the virus, or combinations thereof.

"Agglomerate" or "agglomeration" refers to clumping of virus particles that may occur in the absence of effective means (e.g., in the absence of effective neuraminidase in influenza virus infection) of separating virus particles from one another after release from cells during an infection.

"Substantive" refers to an antiseptic composition (or a film-forming polymer in solution), which when applied to human skin as a uniform wet film in an amount of approximately 4 milligrams per square centimeter (4 mg/cm$^2$) of clean dry skin on an inner forearm and allowed to thoroughly dry (e.g., for at least 10 minutes at 23° C. and 50% relative humidity), resists removal under running tap water at a temperature of about 23° C. to about 24° C. and a flow rate of about 2.4-2.5 liters/minute (L/min) falling from a height of 15 centimeters (cm) and striking the skin immediately above the dry composition (not directly on the dry composition) and then flowing over the dry composition for at least about 15 seconds.

"Symptom" refers to a physiological feature indicating a condition of a disease. Symptoms of influenza can include runny nose, fever, aching muscles, headaches, chills, sweats, dry cough, fatigue, nasal congestion, sore throat, or combinations thereof. Viral loads of influenza at the onset of symptoms can be viral species-dependent and host species-dependent.

For example, in a human, symptoms of influenza A can be present with a viral load of at least 100000 PFU/mL, at least 0.5 million PFU/mL, or at least 1 million PFU/mL. In a mouse, the viral load of influenza A can be present, at the onset of symptoms, of at least 100 PFU/mL.

"Thickener" refers to a substance that increases the viscosity of a liquid without substantially changing its other properties. Thickeners can be anionic, cationic, or neutral. The thickened antiseptic composition does not include a cross-linked polymer (i.e., a gel).

"Treatment plan" refers to a sequence of treatments. "Treat" or "treatment" means to improve the condition of a subject relative to the affliction, typically in terms of clinical symptoms of the condition or viral- or bacterial load.

"Upper intake level" refers to safe intake level for iodine as established by Leung A M, Avram A M, Brenner A V, et al. Potential risks of excess iodine ingestion and exposure: statement by the American Thyroid Association Public Health Committee. Thyroid. 2015; 25(2):145-146.

Aspects of the present disclosure relate to reducing viral (e.g., influenza) transmission by infected individuals and by providing a protective barrier to infection for healthy individuals (i.e., prophylaxis).

It should be understood that (unless otherwise specified) the listed concentrations of all components are for "ready to use" or "as used" compositions. The compositions can be in a concentrated form. That is, certain embodiments of the compositions can be in the form of concentrates that would be diluted by the user with an appropriate vehicle; however, this is typically not convenient for the present application.

The terms "comprises" and variations thereof do not have a limiting meaning where these terms appear in the description and claims.

As used herein, "a," "an," "the," "at least one," and "one or more" are used interchangeably. The term "and/or" means one or all of the listed elements (e.g., preventing and/or treating an infection means preventing, treating, or both treating and preventing further infections).

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Pharmaceutical compositions of the present disclosure can include antiseptic compositions and antiviral compositions. Some antiseptic compositions and antiviral compositions are known and are described herein.

Examples of antiseptic compositions can include those described in U.S. Pat. Pub. No. 20180207122, and U.S. Pat. No. 8,808,722, which are incorporated by reference. Preferred antiseptic compositions are film-forming. For example, film-forming polymers may retain the active antimicrobial component at the afflicted site and/or at a site where infection is initiated (e.g., the nares) for longer periods of time. This may be desirable for certain applications. For example, some film-forming polymers may produce compositions that cannot be washed off easily with water after being applied and dried.

In at least one embodiment, pharmaceutical compositions containing a broad spectrum antiseptic such as iodine or an iodophor, hydrogen peroxide, hypochlorite, chlorhexidine salts, poly(hexamethylene biguanide), triclosan, small molecule quaternary amines such as benzethonium chloride, methylbenzethonium chloride, benzalkonium chloride, and octenidine, antimicrobial metals such as silver, as well as combinations thereof, optionally with an enhancer component, can be used.

Preferably, antiseptic compositions that use iodine or iodophor (e.g., PVP-I) are used. Some antiseptic compositions are also substantive. Examples of substantive antiseptic compositions are commercially available under the trade designation 3M Skin and Nasal Antiseptic by 3M (St Paul, MN). The 3M Skin and Nasal Antiseptic includes about 0.5% available iodine and is approximately 5% PVP-I by weight. 3M Skin and Nasal Antiseptic can include thickeners such as hydroxyethylcelluose, surfactants, and buffers. Additional suitable antiseptic compositions are commercially available under the trade designation Betadine from Aviro Health, Profend from PDI Healthcare, or Nozin from Global Life Technologies.

Suitable concentrations of iodophor can range from 0.25 to 10%, 2.5 to 10.5%, 3.5 to 10.5%, or 4.5 to 5.5% by weight of antiseptic composition. These concentrations are thought to be effective against various encapsulated (enveloped) RNA viruses such as influenza, norovirus, rhinovirus, coronavirus, parainfluenza virus, respiratory syncytial virus (RSV), and combinations thereof. In at least one embodiment, concentrations of iodophor can be no greater than 5.5% by weight iodophor.

In at least one embodiment, the pharmaceutical composition can be applied according to the treatment plan. The treatment plan can include options for treatment after and before (prophylaxis) inoculation with the virus. For example, in one treatment plan, the pharmaceutical composition can be applied to the mammalian subject before inoculation (via the nares of the mammalian subject). In another treatment plan, the pharmaceutical composition can be applied after inoculation with the virus (e.g., at the onset of any symptoms). In another treatment plan, the pharmaceutical composition can be applied in response to another mammalian subject exhibiting symptoms (i.e., prophylaxis) to prevent transmission of the virus to the mammalian subject from the mammalian subject exhibiting symptoms. In another treatment plan, the pharmaceutical composition can be applied to one or more mammalian subject(s) exhibiting symptoms and to one or more mammalian subjects that are in direct contact and/or indirect (via air flow) contact with the mammalian subject(s) exhibiting symptom(s).

In at least one embodiment, the mammalian subject that was exposed to the mammalian subject colonized by the virus should not experience symptoms of the viral infection. In at least one embodiment, the delay in experiencing symptoms by a mammalian subject after exposure to a mammalian subject colonized with virus can be at least 1 day, or can be at least 2 days or greater.

In at least one embodiment, the treatment plan can occur over a duration. The duration can be at least 6 hours, at least 1 day, at least 3 days, at least 5 days, or at least 7 days.

The treatment plan can include multiple applications of the antiseptic compositions during the duration. The frequency of treatment can range between once every 72 hours to between 1 and 12 times per day. For example, the frequency of treatment can be once every 72 hours, once every 60 hours, once every 48 hours, once every 36 hours, once every 25 hours, once every 24.5 hours (i.e., more than 24 hours between applications), once every 24 hours, once every 12 hours, once every 8 hours, once every 6 hours, or 
5 times-, 6 times-, 7 times-, or 8 times per day. The frequency of treatment can occur roughly evenly throughout the day. In at least one embodiment, the treatment can include dosing as a concentrate (i.e., highly concentrated dosages) during shorter intervals during the day. In at least one embodiment, the combination of dose and frequency of treatment will deliver to the mammalian subject less than the upper intake level for the pharmaceutical composition. Further, the treatment plan will not allow the available iodine to surpass the toxicity for an adult human male for iodine (e.g., 2 g/day).

In at least one embodiment, the treatment plan can include applying the pharmaceutical composition to mucosal tissue of a mammalian subject. Aspects of the application of the antiseptic composition are provided by Scholz et. al., U.S. Pat. Pub. No. 20180207122, published Jul. 26, 2018, which is incorporated by reference in its entirety. Preferably, the mucosal tissue refers to that of the nares, nasopharynx, oral cavity, or that of the nasal cavity and/or the anterior nares. The application of the pharmaceutical composition can include inserting a swab with the pharmaceutical composition impregnated therein into the nasal cavity and spreading the pharmaceutical composition along the diameter of the nasal cavity. In at least one embodiment, the antiseptic composition can be applied to the nares at any depth. For example, the antiseptic composition can be applied to the posterior nares at a depth of at least 1 cm from the tip of the nose. In at least one embodiment, a second pharmaceutical composition can also be applied after the first pharmaceutical composition. For example, after the antiseptic is applied, then an antiviral agent can be used (i.e., topically, orally, or injection) in conjunction with the antiseptic for a period of time.

In at least one embodiment, the application of the antiseptic compound can cause retention of the enveloped RNA virus such that the mammalian subject does not transmit the enveloped RNA virus to another mammalian subject.

Figure 1:
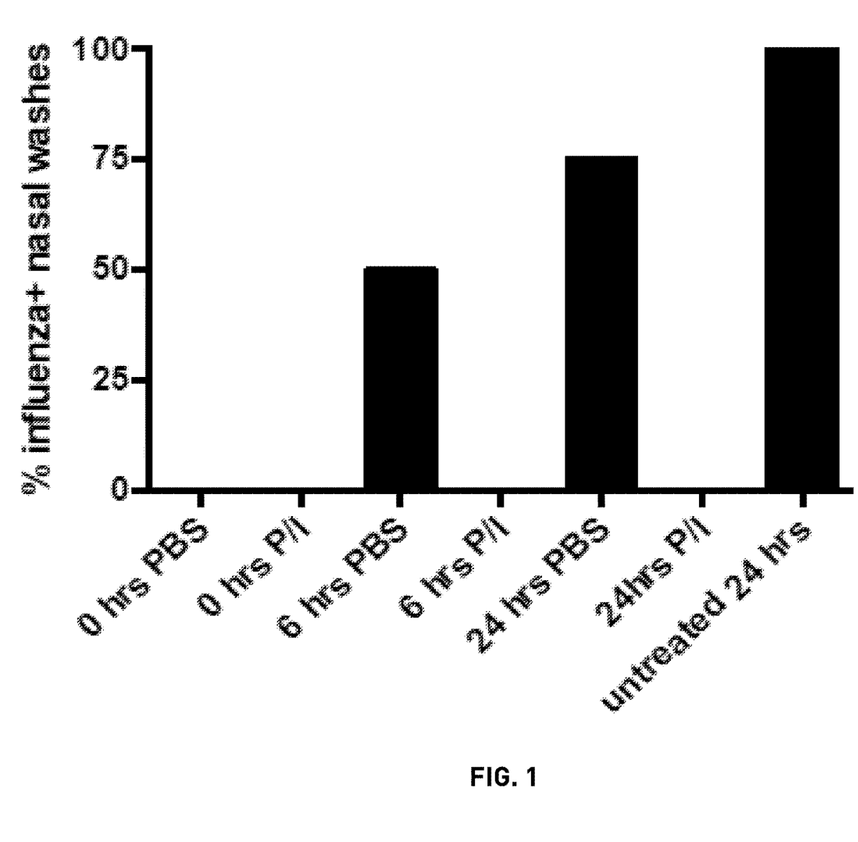
FIG. 1 illustrates a graph in accordance with one embodiment.

In at least one embodiment, "not substantially colonized with" the virus means that a mammalian subject does not exhibit symptoms from the virus (i.e., asymptomatic or pre-symptomatic). Not substantially infected or not substantially colonized with the virus can also mean that the mammalian subject is not substantially colonized by the enveloped RNA virus. In at least one embodiment, not substantially colonized can mean that the recipient mammalian subject (without the virus) can have a viral load at a level that is below the limit of detection or less than 100 pfu/mL.

In at least one embodiment, a mammalian subject can be colonized with the virus at a level that is above the limit of detection but below a level that causes disease when the presence of disease and/or severity of disease is related to the viral load. In at least one embodiment, a mammalian subject colonized with the enveloped RNA virus can have a viral load of at least 1000 pfu/ml, at least 5000 pfu/ml, or at least 10000 pfu/ml, or otherwise have symptoms of the enveloped RNA virus.

EXAMPLES

In the following examples, an antiseptic composition of 3M Skin and Nasal Antiseptic (comprising 5% by weight of povidone-iodine) (herein “Nasal Prep”) was obtained from 3M, St. Paul, MN. Phosphate-buffered saline (PBS), pH=7.4 is commercially available from Thermo Fisher Scientific (catalog number 10010023) Animals were obtained disease-free from commercial experimental animal suppliers.

Example 1. Prevention of Infection of Mice with Influenza Virus by Treatment with the Antiseptic Composition For the following examples conducted with mice, the following additional materials were used:

- 28 Female C567BL/6 mice 8-10 weeks of age obtained from a commercial supplier of disease-free animals
- influenza virus A/PR/8/38 (H1N1).

The mice were divided into three groups; Group 1, Group 2, and Group 3. Group 1 had 12 mice, Group 2 had 12 mice, and Group 3 had 4 mice. The mice in group 1 were treated with antiseptic composition. The mice in group 2 were treated with PBS (as a placebo). The mice in group 3 served as untreated control. The mice were inoculated with 25,000 plaque forming units (PFU) of influenza A/PR/8/38 (H1N1) at 0, 6, or 24 hours after initial treatment (or after no treatment in the untreated control group) with the antiseptic composition or placebo. At three days post infection, the mice were euthanized, nasal washes were performed on the euthanized mice using PBS, and the virus levels were determined by plaque assay.

Example 1

Mice were anesthetized with ketamine before application of 3M Skin and Nasal Antiseptic and prior to inoculation with virus. To each mouse in Group 1, 3M Skin and Nasal antiseptic was applied using a 2 μL pipet tip by spreading approximately 5 μL of 3M Skin and Nasal antiseptic to the inside surfaces of both nares. The nares of each mouse in Group 1 were then inoculated with influenza virus (total of 25000 PFUs) at one of the following time points: immediately after intranasal treatment (4 animals), 6 hours after intranasal treatment (4 animals), and 24 hours after intranasal treatment (4 animals) using 3M Skin and Nasal antiseptic. Three days after inoculation with virus, the animals were euthanized and the virus levels were determined by plaque assay using nasal washes.

Comparative Example 1

Mice were anesthetized with ketamine before application of 3M Skin and Nasal Antiseptic and prior to inoculation with virus. To each mouse in Group 2, PBS was applied using a 2 μL pipet tip by spreading approximately 5 μL of PBS to the inside surfaces of both nares. The nares of each mouse were then inoculated with influenza virus (25000 PFU) at one of the following time points: immediately after intranasal treatment (4 animals), 6 hours after intranasal treatment (4 animals), and 24 hours after intranasal treatment (4 animals). Three days after inoculation with virus, the animals were euthanized and the virus levels were determined by plaque assay using nasal washes.

Comparative Example 2

Mice were anesthetized with ketamine before inoculation with virus. The nares of each mouse in Group 3 were inoculated with influenza virus (25000 PFU). Three days after inoculation with virus, the animals were euthanized and the virus levels were determined by plaque assay using nasal washes.

FIG. 1 is a bar chart that indicates that viable virus was not recovered from any mouse in Group 1, regardless of the length of time (up to 24 hours) between treatment with 3M Skin and Nasal antiseptic and inoculation with virus. FIG. 1 also shows that viable virus was recovered from Group 2, whose individuals were inoculated with virus 6- and 24 hours after application of PBS. FIG. 1. also shows that viable virus was recovered from Group 3, whose individuals were not treated before inoculation with virus. FIG. 1 indicates a 24-hour prophylaxis from infection by influenza using a single application of 3M Skin and Nasal antiseptic.

Figure 2:
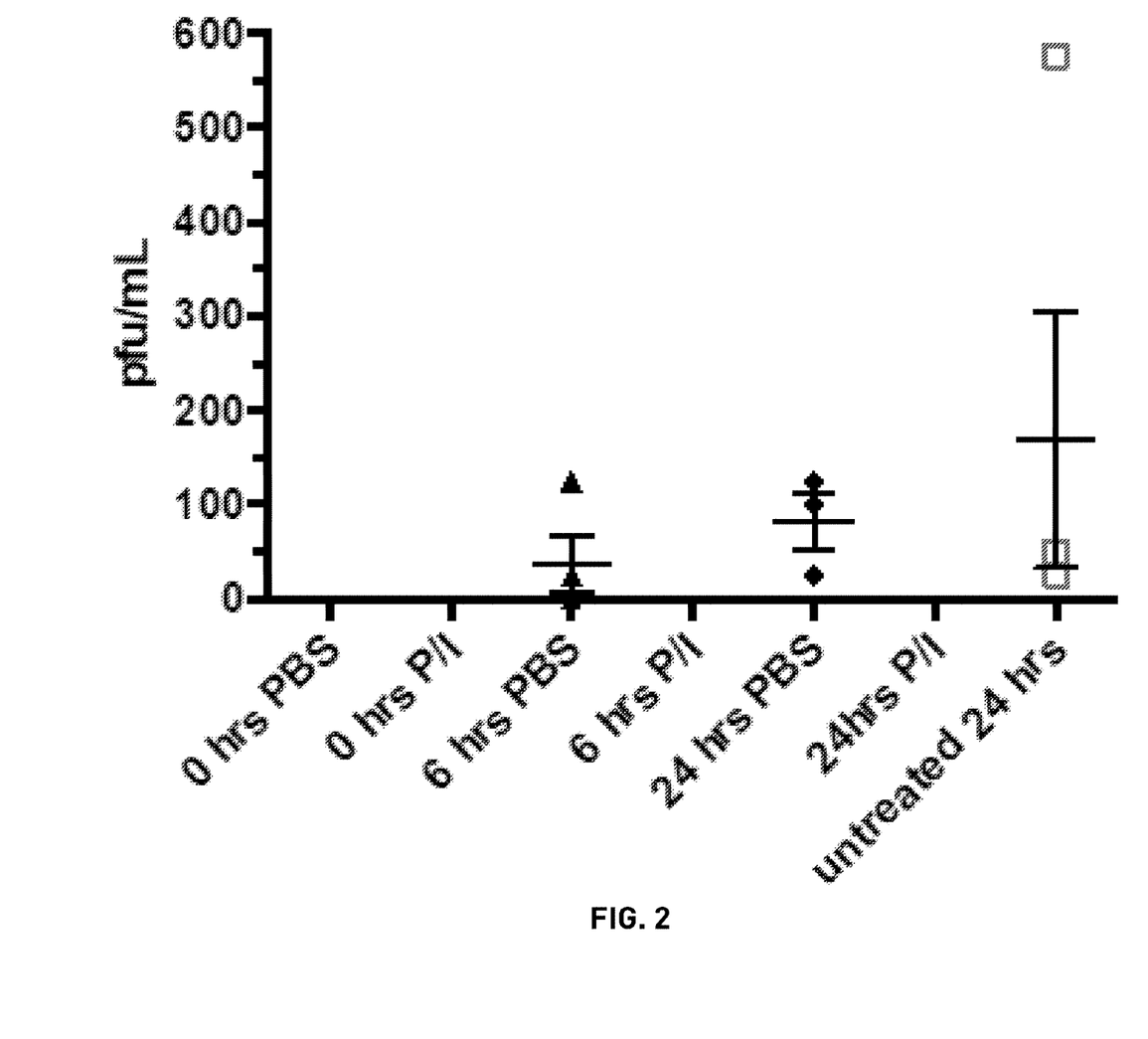
FIG. 2 illustrates a graph in accordance with one embodiment.
Figure 3:
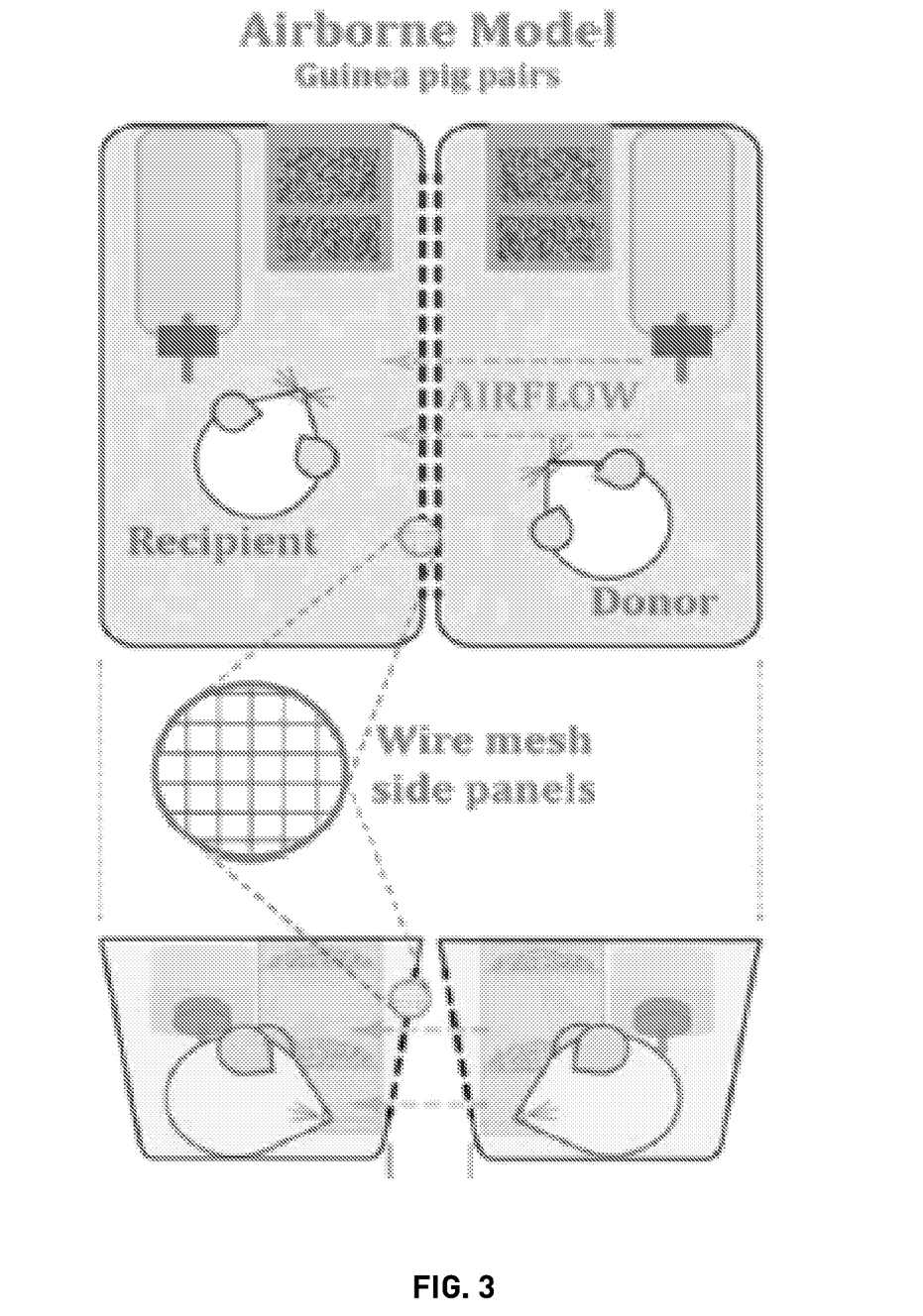
FIG. 3 illustrates an experimental configuration in accordance with one embodiment.
Figure 4:
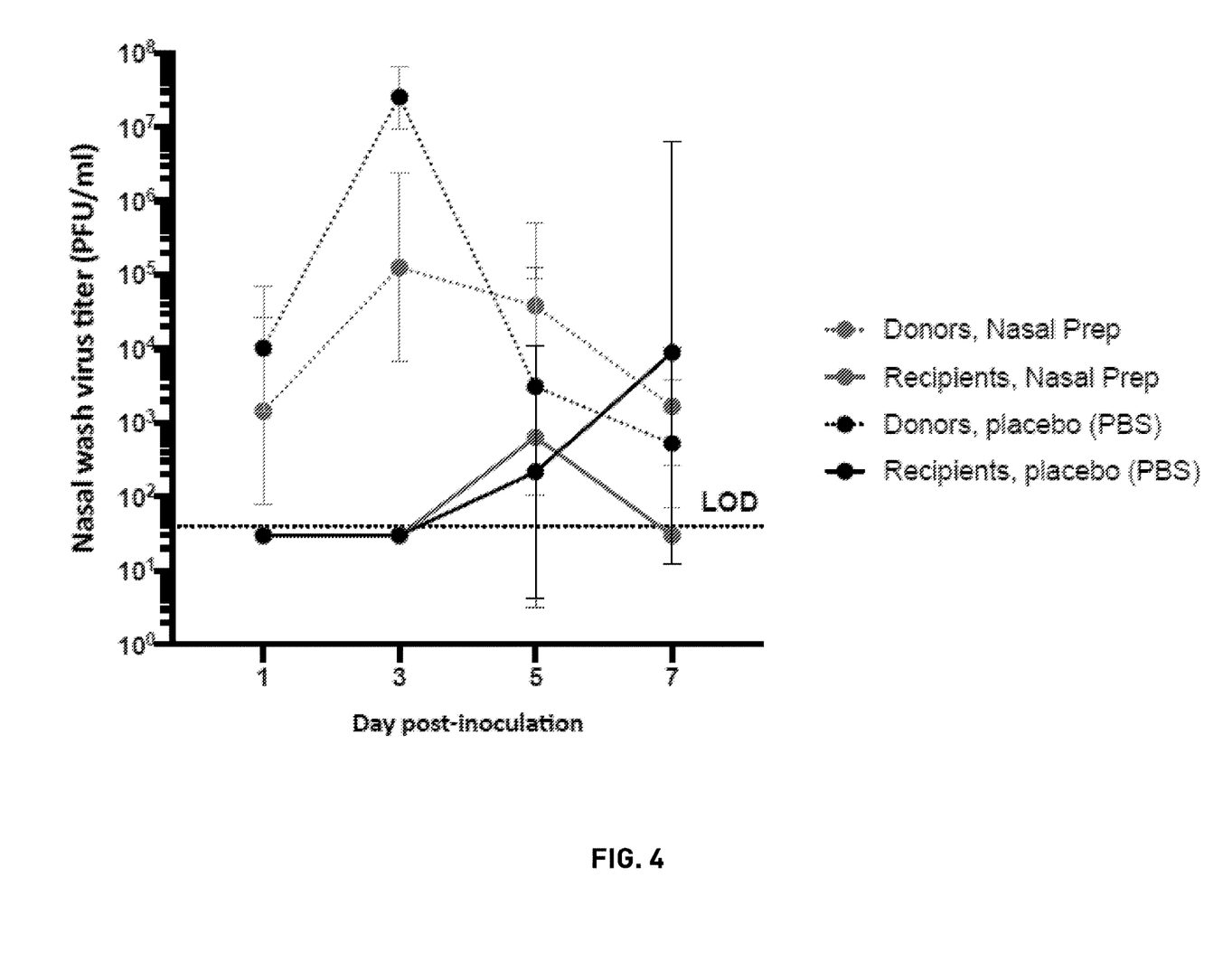
FIG. 4 illustrates a graph in accordance with one embodiment.

FIG. 2 is a chart that indicates that Group 2 had 50 PFU/ml viable virus in the nares when inoculated with virus 6 hours after application of PBS, and 100 PFU/ml viable virus in the nares when inoculated with virus 24 hours after application of PBS. Group 3 had 200 PFU/mL viable virus in the nares 24 hours after inoculation with influenza virus. Thus, the Group 1 animals did not have any viable virus present in their nares after treatment with 3M Skin and Nasal antiseptic followed by inoculation with influenza virus up to 24 hours later.

Example 2. Prevention of Airborne Transmission of Influenza Virus in Guinea Pigs Five- to six-week-old female Hartley strain guinea pigs were obtained from Charles River Laboratories (Wilmington, MA). Animals weighed between 350 and 400 g. Animals were allowed access to food and water ad libitum and were kept on a 12-h light-dark cycle.

Infection and monitoring of guinea pigs: Guinea pigs were anesthetized with a 175-μl mixture of ketamine (30 mg/kg of body weight) and xylazine (5 mg/kg) administered intramuscularly. An inoculum of "Pan99" influenza A virus was instilled intranasally by applying a volume of a stock solution of influenza virus ($3\times10^4$ pfu/mL A/Panama/2007/1999 (H3N2)) to each naris.

Collection of guinea pig nasal wash samples: Prior to nasal wash sample collection, guinea pigs were anesthetized as described above. Nasal washing was performed by instilling a total of 1 mL of phosphate-buffered saline (PBS) into the nares of a guinea pig and allowing it to drain into a sterile petri dish. Supernatants were stored at −80° C. before analysis by plaque assay.

Treatments: Treatments of Nasal Prep and PBS (phosphate buffered saline) were used.

Experiments: Sixteen animals were used in the experiment. Each animal was identified as one animal of a pair, with the cages for each pair connected via a conduit that enabled exchange of air between the two cages as described in FIG. 3.

For the airborne transmission experiments, virus-donor and virus-recipient animals were physically separated by an air-permeable barrier that precludes direct contact transmission while permitting spread by airborne routes (droplet and aerosol) from the donor animal to the recipient animal.

One animal of each pair was infected with the influenza A/Panama/2007/1999 (H3N2)) virus, and animals were subsequently treated according to the treatment schedule described below.

Day −1: On day "−1" of the experiment, animals were divided into pairs and designated as follows:

Four animals were designated "Donor, Nasal Prep," indicating that those animals so designated were to be inoculated with influenza virus and treated with the antiseptic composition.

Four animals were designated as "Recipient, Nasal Prep," indicating that each of those four animals was to constitute a "pair" with one of the "Donor, Nasal Prep" animals. The Recipient, Nasal Prep animals were treated with the antiseptic composition and were exposed to any influenza virus via air that was passed through a conduit from the Donor Nasal Prep animal.

Four animals were designated "Donor, placebo (PBS)," indicating that those animals so designated were to be inoculated with influenza virus and treated with PBS.

Four animals were designated as "Recipient, placebo (PBS)" indicating that each of those four animals was to constitute a "pair" with one of the Donor, placebo (PBS) animals. The Recipient, placebo (PBS) animals were treated with PBS and were exposed to any influenza virus via air that was passed through a conduit from the Donor, placebo (PBS) animal cages.

On Day "−1," all animals designated as "Nasal Prep" were treated with the antiseptic composition by instilling 50 microliters of the antiseptic composition into each naris in an awake, upright animal. Additionally, all animals designated as "placebo (PBS)" were treated with PBS by instilling 50 microliters PBS into each naris in an awake, upright animal.

On Day "0," all animals labels as "donor" were inoculated under ketamine anesthesia (as described above) with 75 microliters of "Pan 99" influenza virus per naris (as described above). Three hours later, all animals were treated with either PBS or the antiseptic composition (as described above) according to their designation for the experiment.

On days +1, +3, +5 and +7, all animals were anesthetized, underwent a nasal wash (by instilling 1 mL PBS sampling solution into the nares (while prone)), were allowed to awaken and then were treated with the antiseptic composition or placebo (PBS) according to their treatment designation for the experiment.

On days +2, +4, and +6, all animals were treated with the antiseptic composition or placebo (PBS) according to their treatment designation for the experiment.

Nasal washes collected on days +1, +3, +5, and +7 were diluted 1-to-10 with PBS immediately after collection. (Earlier in vitro experiments suggested that a 1-to-10 dilution was adequate to prevent residual iodine, rinsed out of the nose during nasal wash, from inactivating virus in the nasal wash samples prior to titration by plaque assay.) For quantitation of viable virus, nasal wash samples were serially diluted and plated onto MDCK cells to quantify virus. Virus quantities were reported as plaque-forming units (pfu). The results of the transmission experiment are shown in FIG. 4.

Results: FIG. 4 illustrates a graph of an average of the viral titters across the population of 4 guinea pigs with LOD being the plaque assay limit of detection. The results of the experiments in Table 1, where the unit is [log(pfu/mL)], show that treatment using the antiseptic composition prevented transmission of influenza virus via airborne transmission in 3 of 4 of the Recipient animals tested, whereas treatment using placebo (PBS) prevented airborne transmission in only 2 of 4 of the Recipient animals treated.

TABLE 1

Guinea Pig transmission data

| | | Donors | | | | | Recipients | | | | Transmission event |
|---|---|---|---|---|---|---|---|---|---|---|---|
| | | | Days post inoculation | | | | | Days post inoculation | | | |
| | | Animal ID | 1 | 3 | 5 | 7 | Animal ID | 1 | 3 | 5 | 7 | (Y/N) |
| EX1 | Nasal | NPRD | 3.2 | 6.6 | 4.7 | 4.2 | NPRR | 0.0 | 0.0 | 5.4 | 0.0 | Y |
| EX2 | Prep | NPOD | 0.0 | 4.2 | 5.3 | 3.3 | NPOR | 0.0 | 0.0 | 0.0 | 0.0 | N |
| EX3 | | NPPD | 4.5 | 3.9 | 5.4 | 2.2 | NPPR | 0.0 | 0.0 | 0.0 | 0.0 | N |
| EX4 | | NPGD | 3.4 | 5.7 | 3.0 | 3.2 | NPGR | 0.0 | 0.0 | | 0.0 | N |
| CE5 | PBS | PBSRD | 4.4 | 7.6 | 3.7 | 3.5 | PBSRR | 0.0 | 0.0 | 0.0 | 0.0 | N |
| CE6 | | PBSBD | 5.0 | 6.8 | 0.0 | 0.0 | PBSBR | 0.0 | 0.0 | 4.9 | 6.5 | Y |
| CE7 | | PBSGD | 3.6 | 7.6 | 3.7 | 3.0 | PBSGR | 0.0 | 0.0 | 0.0 | 6.3 | Y |
| CE8 | | PBSOD | 3.1 | 7.7 | 5.0 | 2.9 | PBSOR | 0.0 | 0.0 | 0.0 | 0.0 | N |

Additionally, treatment using the antiseptic composition of the single Recipient animal that was infected via airborne transmission of influenza virus reduced the viral load (quantity of virus in the nares) of the infected Recipient to below the limit of detection within 48 hours after infection occurred, whereas treatment using PBS resulted in the viral load of at least one of the PBS-treated animals to which virus was transmitted continued to rise during the same 48 hour period of time.

Further, 3 days post-inoculation, the Donors treated with Nasal Prep (EX1-4) had viral titer concentrations that were at least at 1.5 log lower versus the placebo (CE5-8).

Example 3: Assessment of Viral Numbers in the Nares of Guinea Pigs after Treatment with Nasal Prep Infection and monitoring of guinea pigs: Prior to infection with influenza virus, guinea pigs were anesthetized with a 175-µl mixture of ketamine (30 mg/kg of body weight) and xylazine (5 mg/kg) administered intramuscularly. An inoculum of "Pan99" influenza A virus was instilled intranasally by applying a volume of a stock solution of influenza virus ($3 \times 10^4$ pfu/mL A/Panama/2007/1999 (H3N2)) to each naris. (The volume applied is indicated separately for each experiment described below).

Collection of guinea pig nasal wash samples: Prior to nasal wash sample collection, guinea pigs were anesthetized as described above. Nasal washing was performed by instilling a total of 1 mL of phosphate-buffered saline (PBS) into the nares of a guinea pig and allowing it to drain into a sterile petri dish. Supernatants were stored at −80° C. before analysis by plaque assay.

Treatments: Nasal Prep, Vehicle (3M™ Skin and Nasal Antiseptic devoid of povidone iodine and sodium iodide), and PBS (phosphate buffered saline) were used as treatments for the animals.

Day −1: On day "−1" of this experiment, ten guinea pigs were treated as follows:

Four guinea pigs were treated with Nasal Prep (while awake and upright) using a pipette and delivering 50 µL Nasal Prep to each naris (100 µL per guinea pig).

Four guinea pigs were treated with Vehicle (while awake and upright) using a pipette and delivering 50 µL vehicle to each naris (100 µL per guinea pig).

Two guinea pigs were treated with PBS (while awake and upright) using a pipette and delivering 50 µL PBS to each naris (100 µL per guinea pig).

Day 0: All guinea pigs were anesthetized and then inoculated with 150 µL (75 µL per naris) of diluted Pan99 influenza A virus stock solution at a concentration of $6.7 \times 10^3$ pfu/ml, which is equivalent to each animal receiving $1 \times 10^3$ pfu of influenza virus. Six hours later, after the guinea pigs had awoken completely from anesthesia, the treatments were reapplied, as described above (Day −1).

Days +1, +3, +5 and +7: All guinea pigs were anesthetized, underwent a nasal wash (1 mL PBS sampling solution), and then were allowed to awaken. On days 1, 3, and 5, after awakening, the guinea pigs were treated with Nasal Prep, Vehicle, or PBS as described above (day −1).

Days 2, 4, 6: All guinea pigs were treated with Nasal Prep, Vehicle, or PBS, as described above (day −1).

Nasal washes were diluted and plated onto Maden Darby Canine Kidney cells commercially available from Sigma-Aldrich (St. Louis, MO) for quantitation of viable virus.

Figure 5:
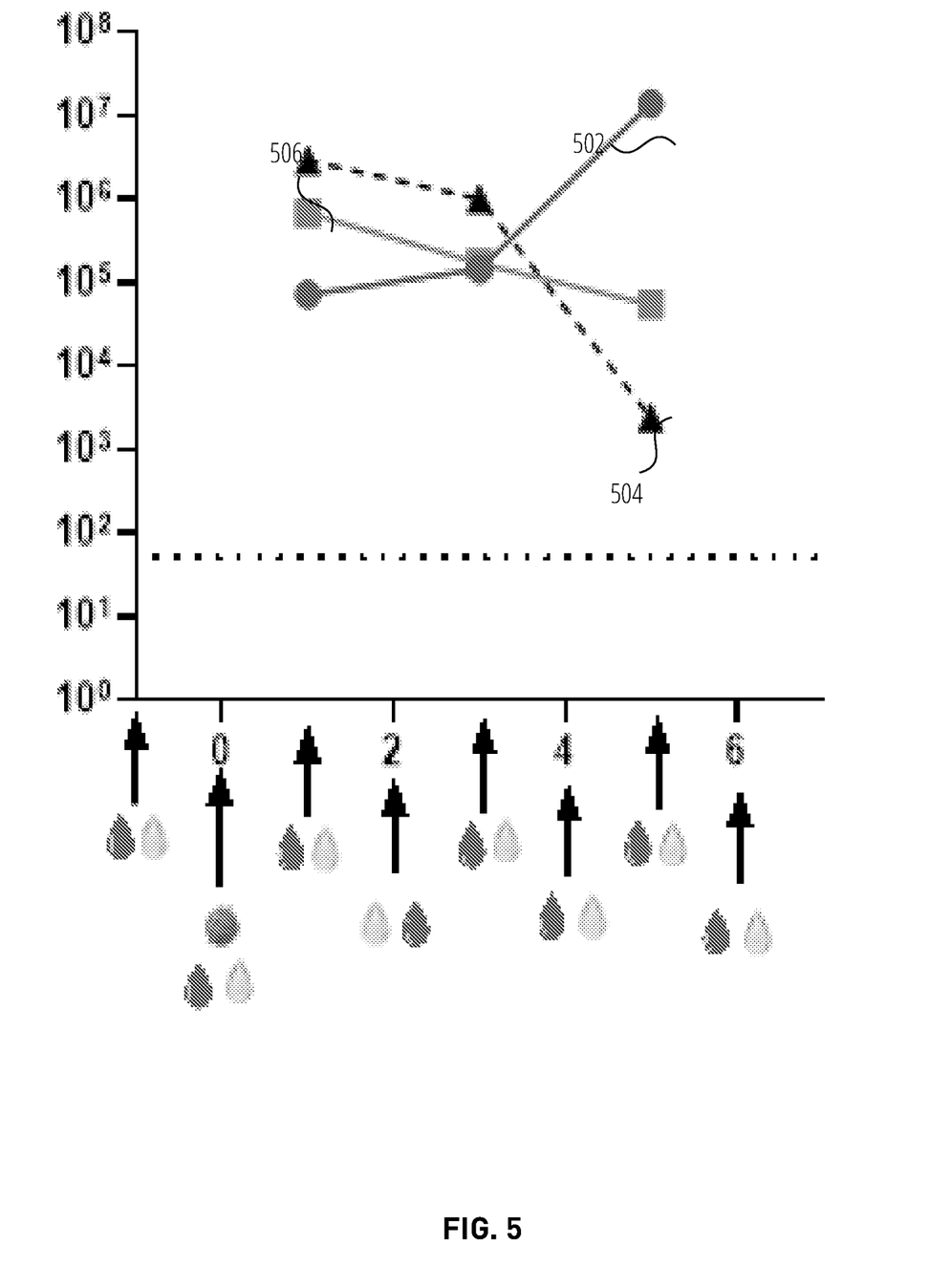
FIG. 5 illustrates a graph in accordance with one embodiment.

The results of Example 3 are shown in FIG. 5.

The results of Example 3 show that the quantity of viable virus increased steadily from day 1 through day 7 for the Nasal Prep-treated animals (502, n=4 animals) and decreased continuously for the vehicle-treated animals (506, n=4 animals) and for the PBS-treated animals (504, n=2 animals).

The results of Example 3, taken with the results from Example 2, show the surprising result that the povidone-iodine composition used in the method of treatment prevents transmission of the virus. Without being bound by theory, it is suspected that the virus particles become retained, perhaps by agglomeration, in the nares in the presence of the thickened povidone-iodine composition and cannot be readily transferred from one animal to another, and that the nasal washes disrupt the postulated agglomeration during sampling of the nares and permit the virions to replicate in the MDCK cells, which results in virus-caused plaques on the MDCK lawns.

Example 4-In Vitro Efficacy of Nasal Prep Against SARS-CoV-2 Virus

Procedure:
Virus, Media, and Cells

SARS-CoV-2 virus stocks were prepared by growing virus in Vero 76 cells. The test medium was MEM supplemented with 2% FBS and 50 µg/mL gentamicin.

Viricidal Assay

The Nasal Prep was tested at full strength (90% Nasal Prep and 10% virus solution), and at three additional serial 10-fold dilutions using sterile water as the diluent. SARS- CoV-2 virus stock was added to triplicate tubes of each prepared concentration at 1/10, so that the final concentrations of Nasal Prep tested were 90% of full strength (0.45% w/w available iodine), 9% of full strength (0.045% w/w available iodine), 0.9% of full strength (0.0045% w/w available iodine), and 0.09% full strength (0.00045% w/w available iodine). Medium only was added to one tube of each prepared concentration of Nasal Prep to serve as cell toxicity control. Ethanol (63%) (commercially available from Sigma Aldrich) was tested in parallel as a positive control for viricidal activity, and water only was tested to serve as the virus control. Solutions and virus were incubated at room temperature during three contact times of 30 seconds, 1 minute, and 2 minutes. Following the contact period, each solution was "neutralized" using a 1/10 dilution of 0.5% sodium thiosulfate in test media. (Sodium thiosulfate, $Na_2S_2O_3$, reduces molecular iodine ($I_2$) to colorless iodide anion ($I^-$), which does not possess in vitro viricidal activity.)
Virus Quantification Neutralized samples were serially diluted using eight half-log dilutions in test medium. Each dilution was added to four wells of a 96-well plate that were 80-100% confluent with Vero 76 cells. The toxicity controls were added to an additional four wells, two of which were infected with virus to serve as neutralization controls, ensuring that any residual test sample that remained in the individual titer assays that were plated did not inhibit growth and detection of surviving virus. All plates were incubated at 37±2° C. under 5% $CO_2$.

On day 6 post-infection, plates were scored for presence or absence of viral cytopathic effect (CPE). The Reed-Muench method was used to determine end-point titers (50% cell culture infectious dose, $CCID_{50}$) of the samples, and the log reduction value (LRV) of the compound compared to the negative (water) control was calculated. Sample results were compared with untreated controls by one-way ANOVA with Dunnett's multiple comparison tests using GraphPad Prism (version 8) software.
Controls Virus controls were tested in water, and the reduction of virus in test wells was compared to virus controls and calculated as the log reduction value (LRV). Toxicity controls were tested with medium not containing virus to determine whether the samples were toxic to cells. Neutralization controls were tested to ensure that virus inactivation did not continue after the specified contact time and that any residual sample remaining in the titer assay plates did not inhibit growth and detection of surviving virus; this was done by adding toxicity samples to titer test plates and then spiking each well with a low number of virions that would produce an observable degree of cytopathic effect during the incubation period.

Results

Virus titers and log reduction values for Nasal Prep against SARS-CoV-2 virus are shown in Table 2.

Full toxicity toward Vero 76 cells was observed in two of the eight half-log dilutions (the 1/10 and 1/100 dilutions) for the highest concentration (90% strength) of 3M™ Skin and Nasal Antiseptic and in the 1/10 dilution for the 9% strength of 3M™ Skin and Nasal Antiseptic. Because of this toxicity, the presence of viable virus could not be ruled out in those wells and, therefore, the limit of detection was 2.7 $log_{10}$ and 1.7 $log_{10}$ $CCID_{50}$ of virus per 0.1 mL. Similarly, ethanol caused toxicity in the 1/10 dilution. A 9% solution of Nasal Prep reduced virus count to below the limit of detection, i.e., by >2 $log_{10}$ $CCID_{50}$ per 0.1 mL (>99%, P<0.001) after a 30-second, 1-minute, or 2-minute contact time with the virus at room temperature. Although not inactivating all virus present, the 0.9% solution reduced virus by >2 $log_{10}$ $CCID_{50}$ per 0.1 mL (99%, P<0.0001) after a 1- or 2-minute contact time and by >1 $log_{10}$ $CCID_{50}$ per 0.1 mL (90%, P<0.01) after a 30-second contact time.

Due to cytotoxicity, the level of reduction by the 90% solution of Nasal Prep was limited to >1 $log_{10}$ $CCID_{50}$ per 0.1 mL (90%, P<0.05) for all three contact times. The 0.09% solution of Nasal Prep did not reduce virus during the tested contact times.

Neutralization controls demonstrated that any residual iodine in the neutralized samples did not inhibit virus growth nor detection of virus in the endpoint titer assays in wells that did not show cytotoxicity. Virus controls and positive controls performed as expected.

Thus, Nasal Prep is viricidal against SARS-CoV-2 at as low as 0.9% strength (0.0045% w/w available iodine) during a contact time of as little as 30 seconds duration.

TABLE 2

Viricidal efficacy of Nasal Prep against SARS-CoV-2 after incubation with virus at 22 ± 2° C.

| Label | Concentration | Available Iodine (w/w) | Incubation time (min.) | Virus Titer[1] | Log Reduction Value (LRV)[b] |
|---|---|---|---|---|---|
| EX9 | Nasal Prep 90% strength | 0.45% | 0.5 | <2.7 | 1.4 |
| EX10 | Nasal Prep 9% strength | 0.045% | 0.5 | <1.7 | 2.4 |
| EX11 | Nasal Prep 0.9% strength | 0.0045% | 0.5 | 2.6 | 1.5 |
| CE18 | Nasal Prep 0.09% strength | 0.00045% | 0.5 | 4.1 | 0 |
| CE19 | Ethanol 63% | 0 | 0.5 | <1.7 | 2.4 |
| CE20 | Vims Control | 0 | 0.5 | 4.1 | N/A |
| EX12 | Nasal Prep 90% strength | 0.45% | 1 | <2.7 | 1.1 |
| EX13 | Nasal Prep 9% strength | 0.045% | 1 | <1.7 | 2.1 |
| EX14 | Nasal Prep 0.9% strength | 0.0045% | 1 | 1.1 | 2.7 |
| CE21 | Nasal Prep 0.09% strength | 0.00045% | 1 | 3.7 | 0.3 |
| CE22 | Ethanol 63% | 0 | 1 | <1.7 | 2.1 |
| CE23 | Vims Control | 0 | 1 | 3.8 | N/A |
| EX15 | Nasal Prep 90% strength | 0.45% | 2 | <2.7 | 1.3 |
| EX16 | Nasal Prep 9% strength | 0.045% | 2 | <1.7 | 2.3 |
| EX17 | Nasal Prep 0.9% strength | 0.0045% | 2 | 1.3 | 2.7 |
| CE24 | Nasal Prep 0.09% strength | 0.00045% | 2 | 3.8 | 0.6 |

TABLE 2-continued

Viricidal efficacy of Nasal Prep against SARS-CoV-2 after incubation with virus at 22 ± 2° C.

| Label | Concentration | Available Iodine (w/w) | Incubation time (min.) | Virus Titer[1] | Log Reduction Value (LRV)[b] |
|---|---|---|---|---|---|
| CE25 | Ethanol 63% | 0 | 2 | <1.7 | 2.3 |
| CE26 | Vims Control | 0 | 2 | 4 | N/A |

[a]$Log_{10}$ $CCID_{50}$ of virus per mL, mean of 3 replicates, "<" means below limit of detection
[b]LRV (log reduction value) is the reduction of virus compared to the virus control

LIST OF ILLUSTRATIVE EMBODIMENTS

1. A method of treatment or prophylaxis of an enveloped RNA virus in a mammalian subject, comprising:
   applying an effective amount of an antiseptic composition or a pharmaceutically acceptable salt of the antiseptic composition, to a mucosal tissue of the mammalian subject having a first viral load;
   allowing the first viral load to reduce to a second viral load over a duration of a treatment plan,
   wherein at least a 0.5 log reduction of the second viral load occurs using the antiseptic composition compared to a placebo during the duration of the treatment plan,
   wherein the antiseptic composition comprises iodine, iodophor, or combinations thereof, and a thickener.
2. The method of embodiment 1, wherein the first viral load is associated with an onset of symptoms for the virus.
3. The method of any of the preceding embodiments, further comprising: applying an effective amount of an antiviral agent to the mammalian subject.
4. The method of any of the preceding embodiments, wherein the placebo is phosphate-buffered saline.
5. The method of any of the preceding embodiments, wherein the iodine or iodophor is present in a sufficient concentration to provide an available iodine concentration of 0.0045 wt-% to 0.55 wt.
6. The method of embodiment 5, wherein the PVP-I has a concentration of no greater than 10 wt. % (100 mg/ml).
7. The method of embodiment 6, wherein the PVP-I has a concentration of 4.5 to 5.5 wt. % (45 to 55 mg/ml).
8. The method of any of the preceding embodiments, wherein the antiseptic composition comprises water, a surfactant, and a buffer.
9. The method of embodiment 8, wherein the antiseptic composition comprises a hydroxycarboxylic acid present at a concentration of at least 2.5 wt-%; an amine oxide; and an iodide salt present in at least a concentration of 2.0 wt-% and at an amount of no greater than 10 wt, wherein the composition is ready to use, and wherein the composition exhibits a decrease in available iodine of no greater than 5% wt/wt when stored at 40° C. for about 6 months.
10. The method of embodiment 9, wherein the hydroxycarboxylic acid is present in an amount greater than 5 wt.
11. The method of embodiment 9, wherein the amine oxide is present in a concentration of 0.25 wt-% to 1.5 wt.
12. The method of embodiment 9, wherein the antiseptic composition further comprises a monosaccharide, a sugar alcohol, or a combination thereof, wherein the monosaccharide, sugar alcohol, or combination thereof is present at a concentration of greater than 5% wt/wt.
13. The method of embodiment 9, wherein the antiseptic composition comprises a surfactant; wherein the surfactant comprises an anionic surfactant, an amphoteric surfactant, a nonionic surfactant, a zwitterionic surfactant, or a combination thereof; wherein the anionic surfactant comprises a phosphate, phosphonate, sulfate, sulfonate, or a combination thereof.
14. The method of embodiment 9, wherein the antiseptic composition comprises a vehicle, wherein the vehicle comprises water and a polyethylene glycol having a weight average molecular weight of less than 1500.
15. The method of any of the preceding embodiments, wherein the antiseptic composition comprises a thickener.
16. The method of any of the preceding embodiments, wherein the antiseptic composition does not contain liposomes.
17. The method of any of the preceding embodiments, wherein the treatment plan comprises applying the antiseptic composition at a frequency of 1 to 12 times daily.
18. The method of any of the preceding embodiments, wherein the treatment plan does not exceed an upper intake level for the antiseptic composition.
19. The method of any of the preceding embodiments, wherein, in the treatment plan, at least 24 hours elapse between applications.
20. The method of any of the preceding embodiments, wherein the duration is 1 day, 3 days, 5 days, or 7 days.
21. The method of embodiment 18, wherein each successive treatment of the antiseptic composition in the treatment plan increases a concentration of the antiseptic.
22. The method of embodiment 18, wherein each successive dosage of the antiseptic composition in the treatment plan decreases a concentration of the antiseptic.
23. The method of any of the preceding embodiments, wherein the antiseptic composition is applied greater than 1 cm into a nasal cavity.

23a. The method of any of the preceding embodiments, wherein the antiseptic composition is applied less than 1 cm into a nasal cavity.

24. The method of any of the preceding embodiments, wherein the enveloped RNA virus is influenza or coronavirus.
25. The method of any of the preceding embodiments, wherein the first viral load is at least 1000 plaque-forming units (PFU) per milliliter.
26. The method of any of the preceding embodiments, wherein the second viral load is no greater than 32 plaque-forming units (PFU) per milliliter.

27. The method of any of the preceding embodiments, wherein the first viral load is no greater than 32 PFU per milliliter.
28. The method of embodiment 27, wherein the second viral load is no greater than 100 PFU per milliliter.
29. The method of any of the preceding embodiments, further comprising:
    applying an effective amount of an antiseptic composition or a pharmaceutically acceptable salt of the antiseptic composition, to a mucosal tissue of a second mammalian subject before exposure to the mammalian subject and according to the treatment plan;
    allowing the mammalian subject to interact with the second mammalian subject for a period of time, wherein the second mammalian subject has no greater than a 0.5 log increase its viral load during the treatment plan.
30. The method of embodiment 29, wherein the period of time is at least 1 hour, at least 2 hours, at least 3 hours, or at least 4 hours.
31. The method of any of the preceding embodiments, wherein interact means contacting with any body part.
32. The method of any of the preceding embodiments, wherein interact means allowing airborne transmission of the enveloped RNA virus.
33. The method of any of the preceding embodiments, further comprising: cleaning the inside of the nares prior to applying the pharmaceutical composition.
34. The method of any of the preceding embodiments, wherein applying comprises spreading the antiseptic composition over the mucosal tissue.
35. The method of any of the preceding embodiments, wherein applying comprises dispensing the antiseptic composition onto the mucosal tissue with a swab.
36. The method of embodiment 35, wherein the swab is a foam-tip applicator or brush.
37. The method of embodiment 35, wherein applying comprises allowing the antiseptic composition to remain on the mucosal tissue for at least 1 minute, for at least 5 minutes, or at least 10 minutes.
38. A method of preventing transmission of an enveloped RNA virus, comprising:
    applying, to a mucosal tissue of a first mammalian subject not substantially colonized with the enveloped RNA virus, an effective amount of an antiseptic composition or a pharmaceutically acceptable salt thereof according to a treatment plan;
    allowing the first mammalian subject not substantially colonized by the enveloped RNA virus to interact with a second mammalian subject colonized by the enveloped RNA virus at a first viral load, the first mammalian subject has a second viral load based on the interaction;
    wherein the second viral load is no greater than 0.5 log increase over an initial viral load over a duration of the treatment plan;
    wherein the mucosal tissue is in the nasopharynx, nasal cavity, or anterior nares of the mammalian subject;
    wherein the antiseptic composition comprises iodine, iodophor, or combinations thereof, and a thickener.
39. The method of embodiment 38, further comprising:
    applying, to the mucosal tissue of the second mammalian subject having the enveloped RNA virus at the first viral load, an effective amount of the antiseptic composition or a pharmaceutically acceptable salt thereof according to the treatment plan.
40. A method of preventing transmission of an enveloped RNA virus from a mammalian subject, comprising:
    applying an effective amount of an antiseptic composition or a pharmaceutically acceptable salt of the antiseptic composition to a mucosal tissue of the mammalian subject having a first viral load for a duration of a treatment plan, wherein the mucosal tissue is in the nasopharynx, nasal cavity, or anterior nares of the mammalian subject;
    allowing enveloped RNA virus to be retained in the mucosal tissue from contact with the antiseptic composition;
    wherein when a second mammalian subject that is not substantially colonized by the enveloped RNA virus interacts with the mammalian subject, the mammalian subject does not transmit the enveloped RNA virus to the second mammalian subject during the duration of the treatment plan;
    wherein the antiseptic composition comprises iodine, iodophor, or combinations thereof, and a thickener.
41. The method of embodiment 38 or embodiment 40, wherein not substantially colonized by the enveloped RNA virus means that a viral concentration of the enveloped RNA virus is below a limit of detection.
42. The method of embodiment 41, wherein not substantially colonized by the enveloped RNA virus means that the first or second mammalian subject does not exhibit symptoms of the enveloped RNA virus.
43. The method of embodiment 38 or embodiment 40, wherein the first viral load is associated with onset of symptoms of the enveloped RNA virus.
44. The method of embodiment 38 or embodiment 40, wherein the first viral load is at least 1000 PFU per milliliter.
45. The method of embodiment 44, wherein the first viral load is at least 10000 PFU per milliliter.
46. The method of embodiment 38 or embodiment 40, wherein the duration is at least 3 days.
47. The method of embodiment 46, wherein, in the treatment plan, more than 24 hours elapse between applications.
48. The method of embodiment 46, wherein the enveloped RNA virus is selected from influenza, or coronavirus.
49. A method of using an antiseptic composition or a pharmaceutically acceptable salt thereof comprising between 0.25% and 10.5 weight percent, inclusive, iodophor as a prophylaxis against influenza, the method comprising applying the antiseptic composition to a mucosal tissue of a mammalian subject according to a treatment plan.
49a. The method of embodiment 49, wherein the antiseptic composition or the pharmaceutically acceptable salt thereof comprises between 3.5 and 10.5 weight percent.
50. The method of embodiment 49, wherein the treatment plan includes applying the antiseptic composition occurs at least 6 hours before inoculation of influenza.
51. The method of any of the preceding embodiments, wherein the treatment plan includes applying the antiseptic composition occurs at least 12 hours before inoculation of influenza.
52. The method of any of the preceding embodiments, wherein the treatment plan includes applying the antiseptic composition occurs at least 24 hours before inoculation of influenza.

53. The method of any of the preceding embodiments, wherein the antiseptic composition comprises between 4.5 and 5.5 weight percent, inclusive, iodophor.
54. The method of embodiment 53, wherein the antiseptic composition is film-forming.
55. The method of embodiment 53, wherein the antiseptic composition is substantive.
56. The method of any of the preceding embodiments, wherein the mucosal tissue is the anterior nares.
57. The method of any of the preceding embodiments, wherein influenza is H1N1.
58. The method of any of the preceding embodiments, wherein no observable increase in viral load occurs 24 hours after inoculation of influenza.
59. A method of treatment or prophylaxis of a virus in a mammalian subject, comprising:
  applying an effective amount of a pharmaceutical composition or a pharmaceutically acceptable salt thereof to a mucosal tissue of a mammalian subject having a first viral load;
  allowing the first viral load to reduce to a second viral load over a duration of a treatment plan, wherein at least a 0.5 log reduction of viral load occurs using the pharmaceutical composition compared to a placebo.

What is claimed is:

1. A method of preventing transmission of an enveloped RNA virus, comprising:
  applying, to a mucosal tissue of a first mammalian subject not colonized by the enveloped RNA virus, an effective amount of an antiseptic composition or a pharmaceutically acceptable salt thereof according to a treatment plan, the treatment plan comprises a plurality of applications with more than 24 hours elapsed between each application;
  allowing the first mammalian subject not colonized by the enveloped RNA virus to interact with a second mammalian subject colonized by the enveloped RNA virus at a first viral load, the first mammalian subject has a second viral load based on the interaction;
  wherein the second viral load is no greater than 0.5 log increase over an initial viral load of the first mammalian subject over a duration of the treatment plan;
  wherein the duration of the treatment plan is up to 24 hours before the interaction and up to 7 days after the interaction;
  wherein the mucosal tissue is in a nasopharynx, nasal cavity, or anterior nares of the first mammalian subject;
  wherein the antiseptic composition comprises:
    greater than 5 wt-% hydroxycarboxylic acid;
    0.25 wt-% to 1.5 wt-% amine oxide;
    0.0045 wt-% to 0.55 wt-% available iodine concentration;
    4.5 wt-% to 5.5 wt-% povidone-iodine;
    a surfactant; and
    water.
2. The method of claim 1, further comprising:
  applying, to the mucosal tissue of the second mammalian subject colonized by the enveloped RNA virus at the first viral load, an effective amount of the antiseptic composition or the pharmaceutically acceptable salt thereof according to the treatment plan, wherein the mucosal tissue is in a nasopharynx, nasal cavity, or anterior nares of the second mammalian subject.
3. The method of claim 1, wherein not colonized by the enveloped RNA virus means that a viral concentration of the enveloped RNA virus is below a limit of detection for the enveloped RNA virus.
4. The method of claim 1, wherein not colonized by the enveloped RNA virus means that the first mammalian subject does not exhibit symptoms of the enveloped RNA virus.
5. The method of claim 1, wherein the first viral load is associated with onset of symptoms of the enveloped RNA virus.
6. The method of claim 1, wherein the first viral load is at least 1000 PFU per milliliter.
7. The method of claim 1, wherein the first viral load is at least 10000 PFU per milliliter.
8. A method of preventing transmission of an enveloped RNA virus from a mammalian subject, comprising:
  applying an effective amount of an antiseptic composition or a pharmaceutically acceptable salt of the antiseptic composition to a mucosal tissue of the mammalian subject having a first viral load for a duration of a treatment plan, wherein the mucosal tissue is in a nasopharynx, nasal cavity, or anterior nares of the mammalian subject and the duration of the treatment plan is up to 24 hours before the interaction and up to 7 days after the interaction;
  allowing enveloped RNA virus to retain in the mucosal tissue from contact with the antiseptic composition;
  wherein when a second mammalian subject that is not colonized by the enveloped RNA virus interacts with the mammalian subject, the mammalian subject does not transmit the enveloped RNA virus to the second mammalian subject during the duration of the treatment plan, the treatment plan comprises a plurality of applications with more than 24 hours elapsed between each application;
  wherein the antiseptic composition comprises:
    greater than 5 wt-% hydroxycarboxylic acid;
    0.25 wt-% to 1.5 wt-% amine oxide;
    0.0045 wt-% to 0.55 wt-% available iodine concentration;
    4.5 wt-% to 5.5 wt-% povidone-iodine;
    a surfactant; and
    water.
9. The method of claim 8, wherein not colonized by the enveloped RNA virus means that a viral concentration of the enveloped RNA virus is below a limit of detection for the enveloped RNA virus.
10. The method of claim 8, wherein the first viral load is at least 1000 PFU per milliliter.
11. A method of preventing transmission of a virus, comprising:
  applying, to a mucosal tissue of a first mammalian subject colonized by a virus with a first viral load, an effective amount of an antiseptic composition or a pharmaceutically acceptable salt thereof according to a treatment plan, the treatment plan comprises a plurality of applications with more than 24 hours elapsed between each application; and
  allowing a second mammalian subject colonized by the virus with a second viral load to interact with the first mammalian subject, the first mammalian subject has a third viral load based on the interaction;
  wherein the third viral load is no greater than 0.5 log increase over the first viral load over a duration of the treatment plan, wherein the duration of the treatment plan is up to 24 hours before the interaction and up to 7 days after the interaction;

wherein the antiseptic composition comprises:
greater than 5 wt-% hydroxycarboxylic acid;
0.25 wt-% to 1.5 wt-% amine oxide;
0.0045 wt-% to 0.55 wt-% available iodine concentration;
4.5 wt-% to 5.5 wt-% povidone-iodine;
a surfactant; and
water.

12. The method of claim 11, wherein the first mammalian subject does not exhibit symptoms of the virus when colonized at the first viral load.

13. The method of claim 11, wherein the first viral load is no greater than 10 PFU per milliliter.

14. The method of claim 11, wherein the treatment plan occurs over a duration of 3 days.

15. The method of claim 11, further comprising applying, to a mucosal tissue of the second mammalian subject, an effective amount of the antiseptic composition or a pharmaceutically acceptable salt thereof according to the treatment plan, wherein the mucosal tissue is in a nasopharynx, nasal cavity, or anterior nares of the second mammalian subject.

16. The method of claim 1, wherein the antiseptic composition has a pH of less than 4.

17. The method of claim 1, wherein applying the effective amount of the antiseptic composition to the first mammalian subject comprises first applying the antiseptic composition at least 24 hours after interaction with the second mammalian subject.

18. The method of claim 1, wherein the antiseptic composition comprises a vehicle, the vehicle comprises water and a polyethylene glycol having a weight average molecular weight of less than 1500.

* * * * *